United States Patent [19]
Seki et al.

[11] Patent Number: 4,980,545
[45] Date of Patent: Dec. 25, 1990

[54] PHOTOMETRIC CIRCUIT

[75] Inventors: Yoichi Seki; Hiroyuki Saito; Michio Taniwaki, all of Yotsukaido, Japan

[73] Assignee: Seikosha Co., Ltd., Japan

[21] Appl. No.: 278,825

[22] Filed: Dec. 1, 1988

[30] Foreign Application Priority Data

Dec. 15, 1987 [JP] Japan .............................. 62-317119

[51] Int. Cl.[5] ........................................... G03B 7/08
[52] U.S. Cl. ................................. 250/214 P; 356/218
[58] Field of Search ........ 250/214 P, 214 DC, 214 R; 356/218, 226, 227

[56] References Cited

U.S. PATENT DOCUMENTS 3,643,563  2/1972  Nobusawa ................. 250/214 P
3,651,744  3/1972  Okada ....................... 250/214 P
4,249,109  2/1981  Ogawa ...................... 250/214 DC Primary Examiner—Edward P. Westin
Attorney, Agent, or Firm—Bruce L. Adams; Van C. Wilks

[57] ABSTRACT

A photometric circuit comprises a switching circuit which causes a photo conductive element which responds to the luminance of an object of measurement to be selectively connected with an oscillation circuit so that the photo conductive element functions as a frequency determining element and a frequency ratio calculating circuit which calculates a ratio of the oscillation frequency obtained when the photo conductive element is in connection with the oscillation circuit to the oscillation frequency obtained when the photo conductive element is not connected with the oscillation circuit. Thus, it is possible to reduce the required capacitance of the capacitor operating as a frequency determining element, lower the voltage required to drive the circuit and yet achieve high measuring accuracy.

7 Claims, 3 Drawing Sheets

PHOTOMETRIC CIRCUIT

BACKGROUND OF THE INVENTION

The present invention relates to a photometric circuit for a camera or the like.

With the spread of automatic cameras, it has become necessary to convert information concerning the luminance of a scene to be photographed into a digital signal and there has been proposed a digital photometric circuit as shown in FIG. 4, arranged such that a photoconductive element Rt for detecting the luminance of a scene to be photographed and a capacitor C are connected in series and the number of clock pulses generated during the period from the time when photometry is started until the terminal voltage of the capacitor C reaches a reference voltage is counted, as disclosed, for example, in U.S. Pat. No. 4,730,202.

Above described arrangement requires the capacitor C to have a large capacitance, e.g., about 0.22 $\mu F$, and therefore suffers from the problems that it is difficult to fabricate the circuit in the form of an integrated circuit and the cost of the capacitor C is high.

The prior art also has the problem that the measuring accuracy may be lowered due to fluctuations in the electrostatic capacitance of the capacitor C or fluctuations in the reference voltage.

Further, as the luminance of the scene to be photographed becomes higher, the capacitor is charged more quickly and hence the measuring accuracy lowers. Since the degree of accuracy on the high-luminance side is relatively low due to the mechanical structure of cameras, the accuracy is synergistically lowered.

The prior art further has the problem that the comparator which is used as a means for making a comparison with the reference voltage needs a power supply which is capable of supplying a high voltage, i.e., three times the threshold voltage of each of the three transistors $T_1$, $T_2$ and $T_3$ because these transistors are interposed in series with respect to the power supply Ve, as shown in FIG. 4.

SUMMARY OF THE INVENTION

It is an object of the present invention to provide a photometric circuit which is designed so that it is possible to reduce the required capacitance of the capacitor, lower the voltage required to drive the circuit and yet achieve high conversion accuracy.

The present invention is provided with a switching circuit which causes a photoconductive element which responds to the luminance of an object of measurement to be selectively connected with an oscillation circuit so that the photoconductive element functions as a frequency determining element and a frequency ratio calculating circuit which calculates a ratio of the oscillation frequency obtained when the photoconductive element is in connection with the oscillation circuit so as to function as a frequency determining element to the oscillation frequency obtained when the photoconductive element is not connected with the oscillation circuit.

DETAILED DESCRIPTION OF THE INVENTION

Figure 1:
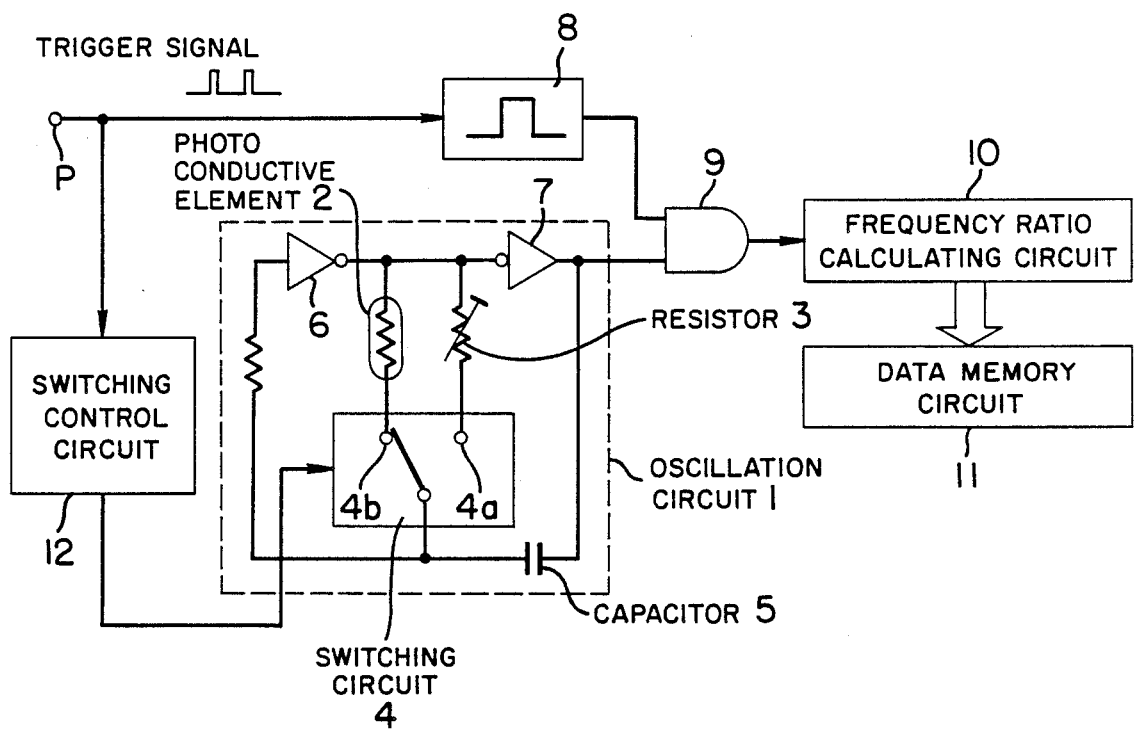
FIG. 1 is an electric circuit diagram showing one embodiment of the present invention.

Referring to FIG. 1, the reference numeral 1 denotes an oscillation circuit which has a resistor and a capacitor as frequency determining elements. More specifically, the oscillation circuit 1 comprises a photoconductive element 2 such as CdS which responds to the luminance of an object of measurement, for example, a scene to be photographed, a reference resistor 3, a switching circuit 4, a capacitor 5 and inverters 6 and 7. The reference numeral 8 denotes a one-shot pulse generating circuit which generates a pulse with a predetermined width, 9 a gate circuit, and 10 a frequency ratio calculating circuit comprising a plurality of counters or the like to calculate a ratio of the oscillation frequency obtained when the photoconductive element 2 is in connection with the oscillation circuit 1 to the oscillation frequency obtained when the resistor 3 is in connection with the oscillation circuit 1. The reference numeral 11 denotes a data memory circuit which stores exposure values respectively corresponding to the frequency ratios with the output from the frequency ratio calculating circuit 10 used as an address The reference numeral 12 denotes a switching control circuit which effects switching of the switching circuit 4.

The operation will next be explained. When a release button (not shown) is pressed to measure the luminance of an object of measurement, two trigger pulse signals are supplied to a terminal P, as shown at a in FIG. 2. In response to the first trigger pulse signal, the output of the switching control circuit 12 is set to "1", as shown at b in FIG. 2. In consequence, the switching circuit 4 is switched over to a terminal 4a to select the reference resistor 3. Accordingly, the oscillation circuit 1 oscillates at a reference frequency which is determined by the reference resistor 3 and the capacitor 5 and the oscillation output is supplied to the gate circuit 9.

Figure 2:
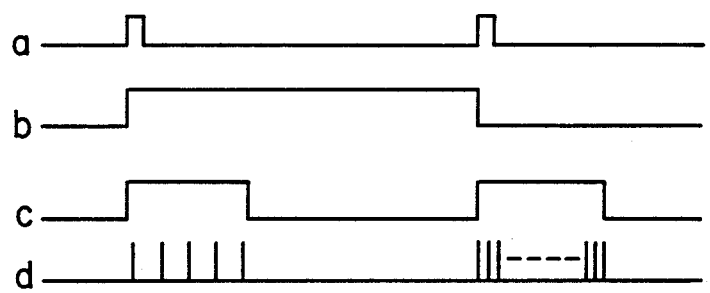
FIG. 2 is a time chart for describing the operation of the embodiment shown in FIG. 1.

On the other hand, the first trigger pulse signal causes the one-shot pulse generating circuit 8 to generate and supply a pulse with a predetermined width T shown at c in FIG. 2 to the gate circuit 9. While this pulse is being generated, the oscillation output of the oscillation circuit 1 is passed, as shown at d in FIG. 2, and the number $p_r$ of output pulses is counted in the frequency ratio calculating circuit 10.

When the second trigger pulse signal shown at a in FIG. 2 is supplied, the output of the switching control circuit 12 is inverted to "0", as shown at b in FIG. 2, so that the switching circuit 4 is switched over to a terminal 4b to select the photoconductive element 2. Accordingly, the oscillation circuit 1 oscillates at a frequency which corresponds to the resistance value of the photoconductive element 2, that is, the luminance of the object of measurement. While another pulse is being generated from the one-shot pulse generating circuit 8, the oscillation output is supplied to the frequency ratio calculating circuit 10 where the number $P_x$ of output pulses is counted in the same way as the above and a ratio of the number $P_x$ of pulses to the number $P_r$ of pulses counted previously, i.e., $P_x/P_r$, that is, a frequency ratio, is calculated.

On the basis of the result of the calculation, an exposure value corresponding to the luminance of the object of measurement is read out from the data memory circuit 11.

The relationship between the ratio $P_x/P_r$ and the luminance of the object of measurement will next be explained. If the value of the capacitor C is fixed, the oscillation frequency f of the oscillation circuit 1 is expressed by the resistance value R selected by the switching circuit 4 as follows:

$$f = 1/KR \text{ (K is a constant)}$$

The relationship between the luminance of the object of measurement and the resistance value $R_x$ of the photoconductive element 2 is expressed as follows:

$$R_x = R_0 2^{\gamma n}$$

where
n: the index of luminance
$\gamma$: the constant determined by the $\gamma$ characteristics of the photoconductive element 2
$R_0$: the resistance value of the photoconductive element 2 at a specific luminance (at this time, n is assumed to be O, i.e., n=O)

If the width of the pulse output from the one-shot pulse generating circuit 8 is represented by T, the relationship between the oscillation frequency f and the number P of pulses passing through the gate circuit 9 is expressed as follows:

$$P = Tf = T/KR \quad (1)$$

Accordingly, if the reference resistor 3 is set so that the relationship between the resistance value $R_r$ of the reference resistor 3 and the resistance value $R_x$ of the photoconductive element 2 at a specific luminance is $R_r = R_x = R_0$, the above-described ratio $P_x/P_r$ at the luminance n is as follows:

$$P_x/P_r = (T/K \cdot R_0 2^{\gamma n})/(T/K \cdot R_r)$$
$$= 2^{\gamma n}$$

Accordingly, if the $\gamma$ characteristics of the photoconductive element 2 are known in advance, it is possible to obtain the luminance index n from the above-described ratio $P_x/P_r$.

As will be clear from the expression (1), the higher the luminance, the larger the number $P_x$ of pulses, so that the ratio $P_x/P_r$ varies by a large margin in response to a slight change in resistance of the photoconductive element 2 and it is therefore possible to increase the measuring accuracy on the high-luminance side.

Although it is generally known that the oscillation circuit is not stable to temperature and the power supply voltage and therefore high performance cannot be obtained, the oscillation circuit 1 wherein the reference oscillation frequency is measured on each occasion and a ratio with respect to it is calculated, as described above, is independent of fluctuations caused by various factors.

Further, the capacitor 5 is only required to have a small capacitance, for example, about 50 pF, and therefore it is possible to fabricate the circuit in the form of an integrated circuit Even if it is not formed into an integrated circuit, it is possible to use a capacitor which is less costly.

Figure 3:
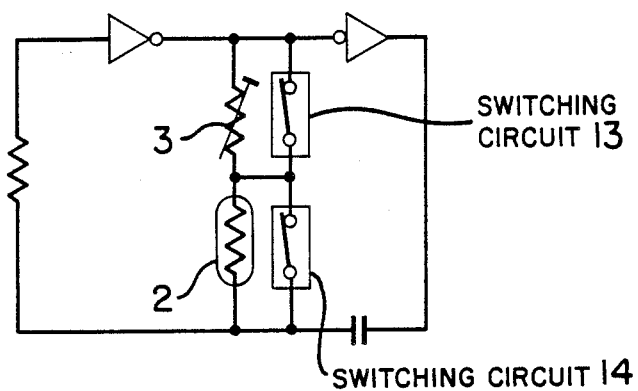
FIG. 3 is an electric circuit diagram showing another example of an essential part of the embodiment shown in FIG. 1.
Figure 4:
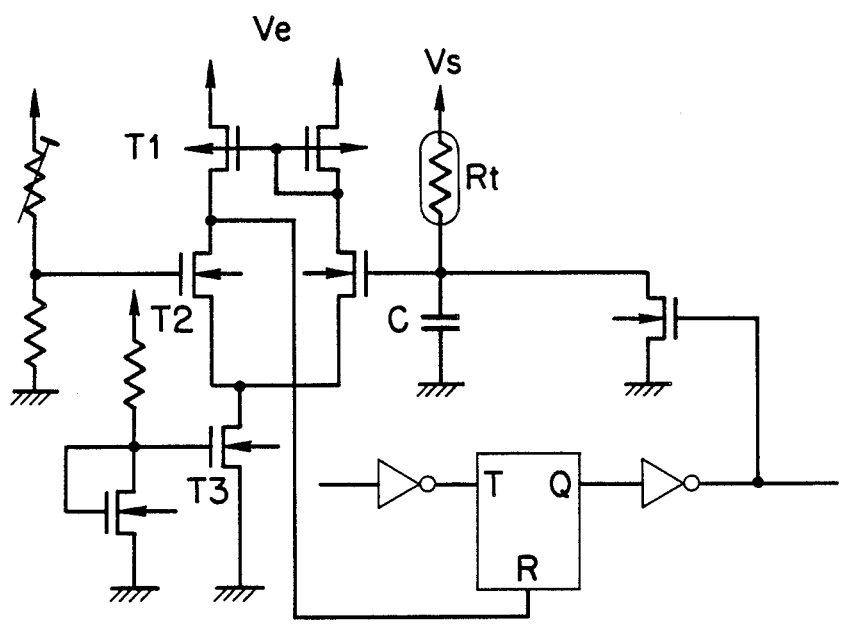
FIG. 4 is an electric circuit diagram showing one example of a conventional photometric circuit.

It should be noted that it is also possible to employ an oscillation circuit having an arrangement such as that shown in FIG. 3. In this case, the oscillation circuit is first oscillated on the basis of the reference resistor 3 with the switching circuit 14 closed, and then the oscillation circuit is oscillated on the basis of the photoconductive element 2 with the switching circuit 13 closed. It is also possible according to this arrangement to obtain the same function and effect as those obtained in the foregoing embodiment.

Figure 5:
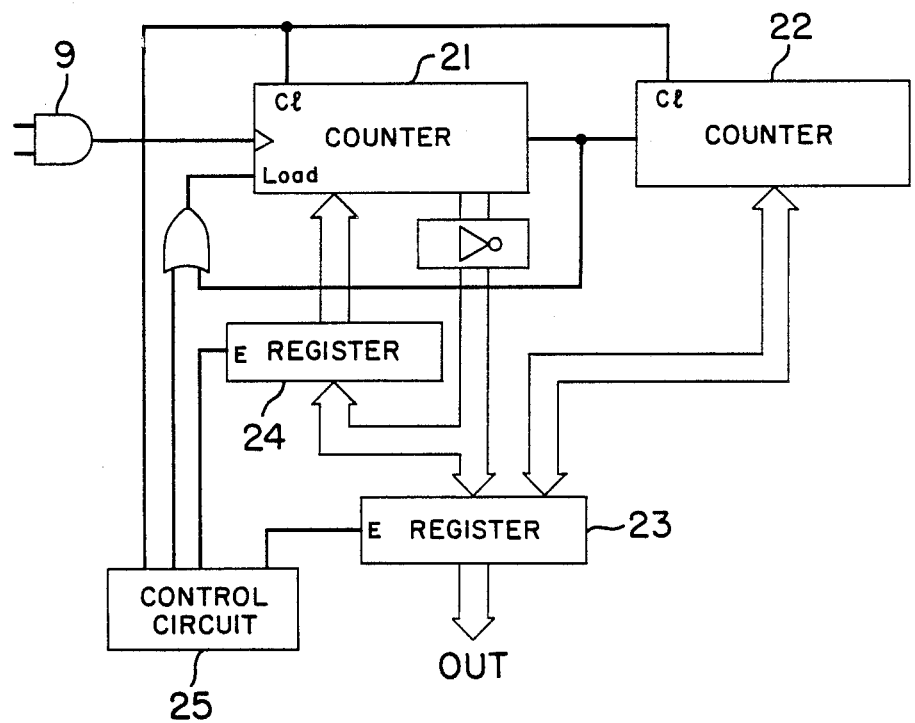
FIG. 5 is a circuit diagram of the frequency ratio calculating circuit of FIG. 1.

FIG. 5 shows the detailed explanation of the frequency ratio calculating circuit in FIG. 1. This frequency ratio calculating circuit comprises a presettable repeat up counter 21, an up counter 22 which has 1 added by the carry of the repeat up counter 21, a register which holds Pr, a register 23 which holds $P_x/P_r$, and a control circuit 25 which controls both of said counters and registers.

The operation is explained here in below. At first, when the control circuit 25 generates a signal which clears the up counter 21, 22, up counter 21,22 are cleared. When a pulse is generated from the one shot pulse generating circuit by a trigger signal on the next timing, the clocks are supplied to up counter 21 from the oscillation circuit and the up counter 21 begins to count. When the one-shot pulse is ended, the pulse number Px remains in the up counter 21. The oscillation frequency is controlled to prevent the up counter 21 from overflow caused by Pr. Next a signal to memorize the data of up counter 21 to register 24 is generated from the control circuit 25 and then the data of 1's complement of Pr is memorized in register 24. After clearing up counters 21,22 again at the next timing, the control circuit 25 generates a signal to load data of register 24 to up counter 22.

Next, the resistance of the oscillation circuit is switched and the oscillation circuit oscillates at the frequencies corresponding to the luminance, besides when a pulse is generated from the one shot pulse generating circuit, the up counter 21 is supplied clocks from the oscillation circuit and begins to count. In this time, the up counter 21 loads data newly from register 24 and counts repeatedly every time when the up counter 21 overflows. At the same time the up counter 22 has 1 added and the up counter 22 counts the number of times of the overflow every time when the up counter 21 overflows. When the one-shot pulse is ended, the integer part of Pr/Px remains in the up counter 21, and the decimal part remains in the up counter 22. These data are latched in register 23 by the signal from the control circuit 25 and then an exposure value corresponding to the luminance of the object of measurement is read out.

According to the present invention, it is possible to employ a capacitor having a relatively small capacitance and hence fabricate the circuit in the form of an integrated circuit. Even if it is not formed into an integrated circuit, it is possible to use a capacitor which is less costly. Moreover, it is possible to conduct photometry with high accuracy independently of temperature and the power supply voltage. Further, since the oscillation frequency obtained when the photoconductive element is connected as a frequency determining element becomes higher on the high-luminance side, the frequency ratio varies by a large margin in response to a slight change in luminance and it is therefore possible to perform highly accurate photometry even on the high-luminance side.

In addition, since it becomes unnecessary to employ a comparator, the power supply voltage can be minimized.

What is claimed is:

1. A photometric circuit comprising: an oscillation circuit having a resistor and a capacitor as frequency determining elements; a photoconductive element which responds to the luminance of an object of measurement; a switching circuit which causes said photoconductive element to be selectively connected with said oscillation circuit to replace the resistor so that said photoconductive element functions as a frequency determining element; and a frequency ratio calculating circuit which calculates a ratio of the oscillation frequency obtained when said photoconductive element is in connection with said oscillation circuit so as to function as a frequency determining element to the oscillation frequency obtained when said photoconductive element is not connected with said oscillation circuit.

2. A photometric circuit comprising: a photoconductive element having a resistance value which is a function of light received thereby; means for producing a variable frequency output signal comprising frequency determining means for determining the frequency of the output signal as a function of a resistance and a capacitance, a given resistance element having a resistance value, and switching means for alternatively connecting the given resistance element and the photoconductive element to the frequency determining means to impart a frequency to the output signal which is alternatively a function of the resistance value of the given resistance element and the resistance value of the photoconductive element; and means for calculating a ratio of the frequency of the output signal as a function of the resistance value of the photoconductive element and the frequency of the output signal as a function of the resistance value of the given resistance element.

3. The circuit according to claim 2, wherein the given resistance element comprises a variable reference resistor.

4. The circuit according to claim 2, wherein the switching means comprises a switch alternatively connecting to the given resistance element and the photoconductive element.

5. The circuit according to claim 2, wherein the switching means comprises two switches connected across the given resistance element and the photoconductive element for alternatively short-circuiting same.

6. The circuit according to claim 2, wherein the ratio calculating means comprises a counter for obtaining a count corresponding to the frequency of the output signal, and means for storing the count.

7. The circuit according to claim 2, further comprising means for storing the ratio.

* * * * *